United States Patent [19]

Lucà

[11] 4,278,047
[45] Jul. 14, 1981

[54] ABSORBENT FOR ANIMAL EXCRETA

[76] Inventor: Sebastiano F. Lucà, Waltharistr. 5 b, D-1000 Berlin 39, Fed. Rep. of Germany

[21] Appl. No.: 81,390

[22] Filed: Oct. 3, 1979

[51] Int. Cl.$^3$ ............................................. A01K 1/015
[52] U.S. Cl. .......................................................... 119/1
[58] Field of Search .............................................. 119/1

[56] References Cited

U.S. PATENT DOCUMENTS

| | | | |
|---|---|---|---|
| 2,848,976 | 8/1958 | Combs | 119/1 |
| 3,029,783 | 4/1962 | Sawyer et al. | 119/1 |
| 3,107,216 | 10/1963 | Hamilton | 119/1 X |
| 3,425,397 | 2/1969 | Schulein et al. | 119/1 |
| 3,675,625 | 7/1972 | Miller et al. | 119/1 |
| 3,765,371 | 10/1973 | Fisher | 119/1 |
| 4,036,928 | 7/1977 | Valenta | 119/1 X |
| 4,159,008 | 6/1979 | Bavaveas | 119/1 |

Primary Examiner—Hugh R. Chamblee

Attorney, Agent, or Firm—Allison C. Collard; Thomas M. Galgano

[57] ABSTRACT

Vermiculite which exists as the product of weathering of certain minerals, such as for example magnesium mica, is used after the technical expansion in a certain particle size smaller than 15 mm, preferably 3-6 mm, and a pouring weight which is smaller than 200 g/l, as an absorbent for animal excreta, for which it has excellent absorption characteristics. The water absorbing capability of the absorbent amounts to 400–600% (g/100g) of the original weight. By the addition of disinfecting agents a litter may be produced having bacteriocidal and fungicidal characteristics. Additionally added surfactant substances make the absorbent readily dispersible, so that it can be flushed without difficulties through e.g. a house toilet. By admixing of gypsum and/or clay powder a certain increase in the specific weight of the litter may be achieved, which thereafter no longer adheres even to very long-haired animal pelts.

11 Claims, No Drawings

ABSORBENT FOR ANIMAL EXCRETA

BACKGROUND OF THE INVENTION

The invention concerns an absorbent for animal excreta, as is for example known as so-called litter that is poured in a practicable layer height onto a floor of stalls, huts, boxes or the like of domestic animals, so that the excreta becoming mixed with this litter may be removed on the one hand in a hygienic manner and on the other hand do not seep into the bottom of the accommodations of the domestic animals and there form unpleasant smelling products of decomposition.

Customarily, substances of an organic or organic type are used as the absorbent, such as e.g. sand, sepiolite, wood chips of a certain particle size, to which odor-suppressing additives may be mixed.

In part these materials have a relatively low adhesion capability or a too high specific weight which is in the neighborhood of about 350–1500 g/l. This high weight not only makes the transportation of the litter more difficult for the animal owner, but it also causes substantial freight costs for the manufacturer and seller of such litter.

SUMMARY OF THE INVENTION

An object of the invention is therefore to produce an absorbent which has a substantially greater absorption capability for liquids than the previously known absorbents.

A further object of the invention is to produce an absorbent having a particularly low specific weight.

Another object of the invention is to produce an absorbent for animal excreta which is sterile and therefore cannot transmit any bacteria.

Another object of the invention is to produce an absorbent which can be produced with the use of an inexpensive starting material that can be found in nature and which is therefore particularly low in cost.

Another object of the invention is to produce an absorbent having a pouring weight which can be increased by the addition of polverulent substances to a certain extent, in order to prevent adhesion of individual particles to very long-haired animal pelts.

DESCRIPTION OF PREFERRED EMBODIMENTS

According to the invention the absorbent for animal excreta consists of vermiculite with a pouring weight <200 g/l, preferably 100 g/l, and a particle size ≦15 mm, preferably 3–6 mm.

Vermiculite is a mineral which after thermal treatment (expansion) has a pouring weight of only about 70–200 g/l. Depending upon particle size vermiculite can absorb 400–600% (g/100 g) of liquid. The absorption capacity of vermiculite thus substantially exceeds that of other porous minerals. For example, pumice of a particle size in excess of 1 mm can absorb only up to 90% (g/100 g) liquid. Correspondingly less advantageous are the values in the case of pure quartz sand of this particle size.

The essential advantage of the vermiculite used according to the invention is thus to be seen primarily in that with small quantities by weight of absorbent large quantities of excreta can be absorbed. The absorbent according to the invention can thus be used with the utmost economy, because for example 1–1.5 kg vermiculite is capable of accepting the same quantity of excreta as about 10 kg of the absorbents currently used for this purpose.

Beyond this, vermiculite is particularly well suited for the stated purpose because the individual particles are soft and offer the domestic animals a support which they consider to have a nice feeling. Moreover, the vermiculite is completely free of dust which not only is advantageous for its use but also for the manufacture.

In a further development of the invention the absorbent may have a disinfecting agent mixed to it in a quantity of about 0.1–5% (g/100 ml). Benzalkonium chloride or a quaternary ammonium compound or the like may for example be used as the disinfecting agent. The litter thus is given bacteriocidal and fungicidal characteristics. The mixing can be effected in a simple manner according to the tumbler mixing principle, e.g. in a bucket mixer. The mixing times are very short. It has been found that the substances to be admixed are incorporated after even a short mixing time completely and uniformly in the vermiculite particles without requiring the use of a particular mix or stirring tool which might disadvantageously influence the structure and particle size of the vermiculite. To this extent, also, the vermiculite is found to be particularly advantageous for the intended purpose.

According to a further embodiment of the invention a surfactant substance with a weight percentage of 1–5% (g/100 ml) may be mixed with the absorbent. Such a substance, for example a tenside, is incorporated in the vermiculite particle in a simple tumble mixer due to the aforementioned characteristics of the vermiculite. This makes the absorbent readily dispersible and the used litter can now be flushed down the house toilet without any difficulties. This type of disposal is particularly helpful if the absorbent according to the invention is used as litter for domestic animals, such as cats, hamsters and the like.

The applicability of the inventive absorbent is, of course, not limited as litter for use in the keeping of domestic animals, but this absorbent may also be used in the keeping of massess of animals, for example in zoological gardens, in farms raising fur bearing animals, on poultry farms, circuses, in short, wherever animals are predominantly kept in limited space and the problem of eliminating the excreta is thus posed.

To keep the inventive course-particle absorbent which, as already mentioned, has an exceedingly low specific weight, from adhering in a long-haired animal pelt, so that individual particles adhere to the pelt of animals which previously have rested on the invention absorbent and can later fall off the pelt at another location which may for instance result in soiling the rooms of an apartment, it is advantageous to use a large-grained vermiculite to which gypsum and/or clay powder have been admixed. This increases the pouring weight, which previously was smaller than 0.2 g/ml, to approximately 0.3–0.8 g/ml, preferably 0.3–0.5 g/ml. This increase of the specific weight suffices to assure the desired effect. These advantageous absorption characteristics of vermiculite are not disadvantageously influenced by the addition of gypsum and/or clay flour as practical tests have shown.

This last-mentioned form of the absorbent thus is particularly advantageous for so-called kitty-litter pans which are used in apartments.

According to a further embodiment of the invention the absorbent is produced by mixing the particulate vermiculite in dry state with gypsum and/or clay powder, and water is added to this mixture under a continuation of the mixing process.

It may be advantageous to remove the not chemically bound water by admitting air into the mixer during the mixing process.

In the following, two examples will be described in more detail relating to the manufacture of 1 kg of vermiculite in each case in the inventive composition:

EXAMPLE 1

1 kg vermiculite 0-6 mm amounting to about 10 liters is mixed in a mixer with 2 kg gypsum for two minutes. 1 kg water is then added to this mixture and mixing is continued for two further minutes.

10 liters of product are obtained with a pouring weight of 0.40 g/ml. By admitting air into the mixer the pouring weight can be brought to approximately 0.35 g/ml.

EXAMPLE 2

1 kg vermiculite 3-6 mm equal to approximately 10 liters is mixed with 1.5 kg clay flour and 2 kg gypsum and thereafter wetted with 1 kg water.

10 liters of product are obtained with a pouring weight of 0.55 g/ml. By admitting of air into the mixer the pouring weight is brought to 0.5 g/ml.

I claim:

1. An absorbent for animal excreta consisting of vermiculite particles having a particle size smaller than 15 mm and a pouring weight smaller than 200 g/l and particles selected from the group composed of powdered gypsum and powdered clay adhering to said vermiculite particles for weighing down said vermiculite particles so that the vermiculite particles will not adhere to fur of animals.

2. An absorbent as defined in claim 1, wherein said particle size is between 3-6 mm.

3. An absorbent as defined in claim 1, wherein said pouring weight is 100 g/l.

4. An absorbent as defined in claim 1, further comprising a disinfectant admixed with vermiculite in an amount of 0.1-5 percent by volume.

5. An absorbent as defined in claim 4, wherein said disinfectant is selected from the group consisting of benzalkonium chloride and quaternary ammonium.

6. An absorbent as defined in claim 1, and further comprising a surfactant admixed with the vermiculite in an amount of about 1-5 percent by volume.

7. An absorbent as defined in claim 1, wherein said absorbent has a pouring rate of 0.3-0.8 g/ml.

8. An absorbent as defined in claim 1, wherein said absorbent has a pouring rate of 0.3-0.5 g/ml.

9. A method of making an absorbent for animal excreta, comprising the steps of combining dry vermiculite particles and at least one member selected from the group consisting of powdered gypsum and powdered clay; mixing the combined material in dry state; adding water to the thus obtained mixture; and continuing the mixing until the materials combine and form a pourable mixture of powder-coated vermiculite particles.

10. A method as defined in claim 9, and further comprising the step of admitting air into the mixture during the mixing step, so as to remove excess water not absorbed by the materials of the mixture.

11. An absorbent for animal excreta consisting of vermiculite particles having a particle size between 3 and 6 mm and a pouring weight of about 100 g/l, particles selected from the group consisting of powdered gypsum and powdered clay adhering to said vermiculite particles for weighing down said vermiculite particles so that the vermiculite particles will not adhere to fur of animals, a disinfectant selected from the group consisting of benzalkonium chloride and quaternary ammonium and a surfactant admixed with the vermiculite in an amount of about 1-5% by volume.

* * * * *